United States Patent [19]

Hefele

[11] Patent Number: 5,569,348

[45] Date of Patent: Oct. 29, 1996

[54] METHOD FOR THE RASTER-PATTERN COATING OF FABRICS WITH HOT MELT ADHESIVE

[75] Inventor: Josef Hefele, Gräfelfing, Germany

[73] Assignee: Kufner Textilwerk GmbH, Munich, Germany

[21] Appl. No.: 412,145

[22] Filed: Mar. 28, 1995

[30] Foreign Application Priority Data

Mar. 30, 1994 [EP]  European Pat. Off. .............. 94105055

[51] Int. Cl.⁶ .......................... B29C 65/52; B32B 31/12; B32B 7/14; B05D 1/36
[52] U.S. Cl. ...................... 156/239; 156/291; 156/309.9; 427/208.2; 427/288; 427/265; 427/412; 428/198; 428/290
[58] Field of Search ..................... 156/230, 231, 156/238, 239, 240, 235, 291, 309.9; 427/194, 196, 202, 258, 265, 208.2, 208.6, 208.8, 412, 288; 428/198, 290; 118/202, 212, 255, 262

[56] References Cited

U.S. PATENT DOCUMENTS

| | | | |
|---|---|---|---|
| 2,380,047 | 7/1945 | Hyman | 428/258 |
| 2,894,855 | 7/1959 | Wilhelm et al. | 264/54 |
| 3,575,764 | 4/1971 | McFarren | 427/258 |
| 3,667,422 | 6/1972 | Saladin | 118/202 X |
| 3,922,418 | 11/1975 | Lauchenauer | 428/198 X |
| 4,055,688 | 10/1977 | Caratsch | 427/265 X |
| 4,141,313 | 2/1979 | Hefele | 118/212 |
| 4,365,968 | 12/1982 | Gregorian et al. | 427/258 X |
| 4,368,240 | 1/1983 | Nauta et al. | 118/120 X |
| 4,655,868 | 4/1987 | Hefele | 156/238 |
| 5,153,064 | 10/1992 | Hefele | 428/355 |

FOREIGN PATENT DOCUMENTS

| | | |
|---|---|---|
| 0238014 | 3/1987 | European Pat. Off. . |
| 607693 | 9/1948 | United Kingdom . |
| 1360496 | 7/1972 | United Kingdom . |

*Primary Examiner*—Michael W. Ball
*Assistant Examiner*—Francis J. Lorin
*Attorney, Agent, or Firm*—Scully, Scott, Murphy & Presser

[57] ABSTRACT

This invention describes a method for the raster-pattern coating of fabrics with hot melt adhesives by application of hot melt adhesive layer (1) on an intermediate carrier (12, 14) and by transfer of the hot melt adhesive layer (16) from the intermediate carrier (12, 14) to a final support (18), especially lining material, wherein the hot melt adhesive-containing layer (16) on the intermediate carrier (12, 14) is provided with a further layer (8) which results in the adhesion to the final support. Also, a fabric (38) obtainable through this method is described. Such a fabric can be used as a fixable liner material, especially in outerwear.

22 Claims, 9 Drawing Sheets

METHOD FOR THE RASTER-PATTERN COATING OF FABRICS WITH HOT MELT ADHESIVE

BACKGROUND OF THE DISCLOSURE

This invention relates to a method for the raster-pattern coating of fabrics, especially lining materials for outerwear, with hot melt adhesive through application of the hot melt adhesive on an intermediate carrier and transfer of the hot melt adhesive from this intermediate carrier to a final support while obtaining the coated fabric. This invention also relates to such a fabric and the particularly favorable use thereof.

Raster-pattern designed coating methods with hot melt adhesives which have gained considerable importance have been described in "Handbook of Textile Fixation Linings" from Professor Dr. Sroka, 3rd enlarged edition 1993, Hartung-Gorre Publishers, Konstanz. They are the powder and paste screen printing process under use of screen printing stencils, the powder dot gravure printing method with engraved rollers, various double coating methods, two hot melt methods in gravure printing and screen printing, and, finally, three transfer methods.

In the transfer methods, the coating occurs on a band- or roller-shaped intermediate carrier from which it is ultimately transferred onto the actual final support, the fabric. The advantage of the transfer method as compared to the previously named coating methods lies in that every raster dot always has exactly the same size and formation, while this is only then the case by the direct coatings when the carrier surface is uniform and quite smooth. Also, the coating by the transfer method allows the temperature strain of the final support to be maintained at a low level, whereby the softness and fullness of the fixation is promoted.

In all three transfer methods which have become well-known, the transferred hot melt adhesive dot has a thin, widely rolled lamina form because a relatively higher pressing pressure must be applied for the transfer of the tenaciously viscous hot melt adhesive from the intermediate carrier on the final support. Such a lamina form is not avoidable up to now. In this method, the hot melt adhesive only penetrates a little into the final support, i.e. the fabric. The penetration is also poor in the fixation such that backward penetration and/or penetration of the hot melt adhesive through the fabric can be reduced. However, a complete prevention of the backward penetration has nevertheless not yet been successful. Moreover, it is disadvantageous that, simultaneously, a loss of adhesive strength and resistance to washing and dry-cleaning due to the severely flattened lamina form is not avoidable. Up to now, a lining material according to a transfer method which shows no tendency to penetrate backward and which simultaneously has a high adhesive strength and resistance to washing and dry cleaning of the therewith manufactured composite material has not been successfully made available.

SUMMARY OF THE INVENTION

Therefore, it is an object of this invention to provide a method for the raster-pattern coating of fabrics that retains the previous advantages of the transfer method and eliminates the disadvantages described above. Additionally, a fabric is provided that does not have the above-discussed disadvantages in use as an lining material.

For the solution of this problem, a method for the raster-pattern coating of fabrics with hot melt adhesives of the type named at the outset is provided according to the invention, wherein the method is characterized in that the raster of a hot melt adhesive-containing layer on the intermediate carrier is provided with a further layer which is applied thereon which results in the adhesion to the final support, i.e. the fabric.

Particularly advantageous embodiments of the method according to the invention are the subject matter of claims 2 to 18.

DETAILED DESCRIPTION

Surprisingly, it was determined that the advantages of the known transfer method can be retained and, simultaneously, the described disadvantages can be avoided when the raster-pattern hot melt adhesive-containing layer applied on an intermediate carrier is wet with a further layer by dipping the raster in a free-flowing film. After drying, this wet hot melt adhesive-containing layer is transferred in a further method step from the intermediate carrier on the final support, namely the fabric, and subsequently the intermediate carrier which has no more hot melt adhesive is pulled off from the final support. Thereby, a fabric is obtained in which the hot melt adhesive-containing layer, dipped in the film and wet, assumes a structure with a further layer in an unaltered raster form.

After the transfer onto the final support, the further layer resting on the hot melt adhesive lies between the hot melt adhesive and the final support, through which a barrier effect is obtained by the fixation of the final support on the outer material by avoiding a backward penetration through the final support and, instead, the hot melt adhesive is forced to intensively bind with the outer material.

Therewith, a fabric is also made available according to the invention which is obtainable by the described method, wherein this fabric, by the fixation with other fabrics, is distinguished by a particularly high resistance to washing and dry-cleaning of the produced adhesive composite material; this fabric also shows no reduction of adhesion when it is used as an lining material, especially for outerwear.

Every dot of the raster-pattern hot melt adhesive applied on the intermediate carrier has, as in the already known transfer coating methods, the same size such that differences in the uniformity of the adhesive composite material due to different sizes and shapes of the hot melt adhesive dots can be reduced and/or avoided. A further advantage of the fabric produced by the coating method according to the invention is that its temperature stress during manufacture barely goes beyond about 160° C., and therewith, lies distinctly lower than in methods which make a simple coating possible and use a temperature up to 250° C. Through the lower temperature stress, the softness and fullness of the fixed composite materials are especially increased.

The softness and fullness are also increased in that the hot melt adhesive dots in the fabric produced according to the invention do not have the form of widely rolled laminas which the fabrics produced according to the known transfer methods have, as it was established at the outset.

The layer structure of the fabric with a further layer obtained by the coating method of this invention also leads to a complete freedom of backward penetration. At the same time, it has become possible to eliminate the bubble-shaped separations in the diagonal pulling of the fixation system often observed in the previous direct coatings and to optimize their adhesive strength and resistance to washing and dry-cleaning. In many cases the adhesive strength values, particularly evident in difficulty fixable outer materials, even extend beyond those of the known direct double coatings. For one thing, the adhesion-promoting and bubble-reducing uniformity of the coating dots is missing in the direct double coatings, for another, the structure of one layer, which exerts a barrier effect, and the hot melt adhesive layer are not optimally matched to each other.

In the normally applied trickled paste dot of today (compare Sroka, at pages 131–136 and 173), the applied trickle layer extends beyond the base layer and, with the projecting portion, hardly contributes to adhesion; rather to a certain backward penetration susceptibility. Also with the trickled paste dot, it has not been successful to maintain the region between the dots completely free from scattered dots, particularly of the very fine-grained type (powder dust), whereby an undesired hardened feel emerges, the backward penetration susceptibility further increases, and the adhesion strength is again unfavorably affected.

Contrary to this, the transfer coating with a further layer according to this invention is preferably formed in such a way that the fabric produced by the method according to the invention has hot melt adhesive-containing dots whose further layer is also dot-shaped, wherein these latter dots have the same base surface as the hot melt adhesive-containing dots. In doing so, only the head of the hot melt adhesive-containing dots applied on the intermediate carrier are wet with the agent constituting the further layer. A wetting of the region between the dots which would reduce the softness feel can thereby be entirely eliminated.

A film of a dispersion or a solution of a plastic or resin which is no longer thermo-activatable under the fixation conditions is preferably used as the further layer. Preferably, this plastic or the resin is curable and looses the thermo-activatability through the curing under formation of the desired barrier effect. The dispersions or solutions containing this agent should still be free-flowing and thickened in the processing state.

Curable agents based on poly(meth)acrylate, polyacetate, polyurethane, polybutadiene styrene, polyacrylonitrile butadiene styrene, polyacrylonitrile, polyacrylonitrile butadiene, urea-formaldehyde resin, melamine-formaldehyde resin, alkylurea-formaldehyde resin and their etherification products and the like are preferably used.

Solutions or dispersions are also useable which do not have to condense or cure under manufacture conditions, but, in ironing (fixation) of the coated fabric, can not demonstrate any appreciable flowability. For example, several employable polyurethanes without curing components are considered for this. In any case, it is required that the further layer formed under the hot melt adhesive in the produced fabric, which has the barrier effect, is completely washable and dry-cleanable.

If products with resistance to washing and dry-cleaning which are non-cured, but non- or barely flowing in the fixation are used, in several cases a subsequent temperature treatment can be advantageously omitted or this can be carried out on a short temperature treatment section. In relatively mild temperature treatments around 100° C., 50:50 mixtures of curable polyacrylates and curable polyurethanes in the presence of alkylurea-formaldehyde resins and the curing of catalyzing acids or acid donors can also be used.

The hot melt adhesives suitable for the method are preferably based on copolyamides, copolyesters, polyurethanes or high-density polyethylenes or a mixture thereof. In raster processing with customary low dot height, it can be advantageous to provide the coating substance with portions of aerating agents. For example, one can mix the hot melt adhesive paste for the manufacture process according to FIG. V (see the subsequent description of FIG. V) with ammonium bicarbonate as an aerating agent in order to achieve an inflation and volume increase of the paste dots. Also, organic aerating agents such as azo compounds, hydrazine derivatives, semi-carbazides, azides, triazols, N-nitroso compounds are useable.

As an intermediate carrier, a heating roller or a carrier band can be used. The carrier band can be designed in the form of a continuous band so that it forms a loop and is lead running true. A band with beginning and end is unwound from a beam and wound on another beam with little installation effort. The roller as well as the carrier band, which serve as the intermediate carriers, have an adhesive surface and are for example rubber-coated, particularly preferably silicon rubber-coated.

Polyester textiles and textiles of high temperature resistant reinforced fibrous materials, such as glass fiber textiles and textiles of polyimide, polyaromatic and carbon fiber materials are preferred as material for the carrier band. Textiles of high temperature resistant fibrous materials are particularly favored when high temperature resistances are desired or required. A fine and impermeable, woven, silicon rubber-coated textile with a thickness of 0.10 to 0.15 mm is suitable as a rubber-coated polyester textile.

The rubber-coating on the roller preferably has a thickness of 0.5 to 2.0 mm, particularly preferred 1.0 to 1.5 mm. The silicon rubber-coated carrier band is preferably 0.10 to 0.15 mm thick. The application of the hot melt adhesive on the intermediate carrier can occur according to one of the known methods, for example, according to the powder gravure printing method, hot melt gravure printing method or screen printing method. If a carrier band is used as an intermediate carrier, this can be heated to a higher temperature before or after the raster-pattern coating with the hot melt adhesive.

The carrier band is advantageously guided over suitable heating rollers for heating before the coating. After the application of the hot melt adhesive on the intermediate carrier, optionally, a drying and/or sintering-on or sintering-through occurs first, before the further layer is applied. For example, the pre-drying, sintering-on or sintering-through can occur on a rubber-coated heating roller. By using a carrier band, it can be necessary, however, to guide the raster-pattern coated carrier band with hot melt adhesive through a drying duct heated with circulating air and/or an infrared-heated sinter duct. Subsequently, a coating occurs with the film material for the further layer. This film material is applied onto the heads of the hot melt adhesive dots by a customary rollcoater. After the wetting of the hot melt adhesive dots with the film material, the intermediate carrier coated in this way can first be lightly pre-dried in order to remove a small part of the volatile components of the applied film mass. A curing is not yet permitted to take place while doing so.

After the intermediate carrier is provided with hot melt adhesive and the further, optionally lightly pre-dried layer of the film mass, the fabric to be coated for the transfer is laid out and pressed on the side of the intermediate carrier which carries the hot melt adhesive-containing layer structure. Thereby, the fabric comes in contact with the still fluid film material applied on the hot melt adhesive-containing dots, and an anchoring of the wet hot melt adhesive-containing dots to the fabric occurs. If a rubber-coated heating roller with sufficiently large circumference is used as an intermediate carrier, the fabric leaves this heating roller, after further drying, under entrainment of the entire coating, for example, over a deflection roller and is then preferably lead to a further heating device, for example to a infrared radiator or also a hot air heating device. Before the entrance of the coated fabric in this last heating device, it is advantageous to install a take-off and compression roller which puts the final support loosely on the transport band of the heating device. Preferably, this take-off and compression roller have a non-slip coat, for example a burling coat. By using the take-off and compression roller, later longitudinal shrinking phenomenon, especially in synthetic articles, are effectively eliminated.

A light pre-drying of the applied film mass can not only occur before laying-on the final support on the coating on the section between the place on which the film is applied on the hot melt adhesive-containing dots to the point of laying-on of the final support. Additionally, a further drying and, optionally, a pre-curing of the film mass occurs from the laying-on point of the final support to the removal of the coated final support from the rubber-coated heating roller. The residual curing and, optionally, subsequent drying can then occur in the above mentioned in-line heating device.

When a rubber-coated heating roller is used as an intermediate carrier, the surface temperature of this heating roller preferably lies between 130° C. and 150° C. If carrier bands are used, the temperature during the film application should be dropped down to room temperature. The subsequent drying until the separation of the final intermediate carrier can then be carried out at 75°–120° C. during the beginning of the softening of the hot melt adhesive.

BRIEF DESCRIPTION OF THE DRAWINGS

The invention is illustrated as follows with respect to the Figures. The drawings show:

FIG. I: A fabric obtainable by the described method;

Figure 1:
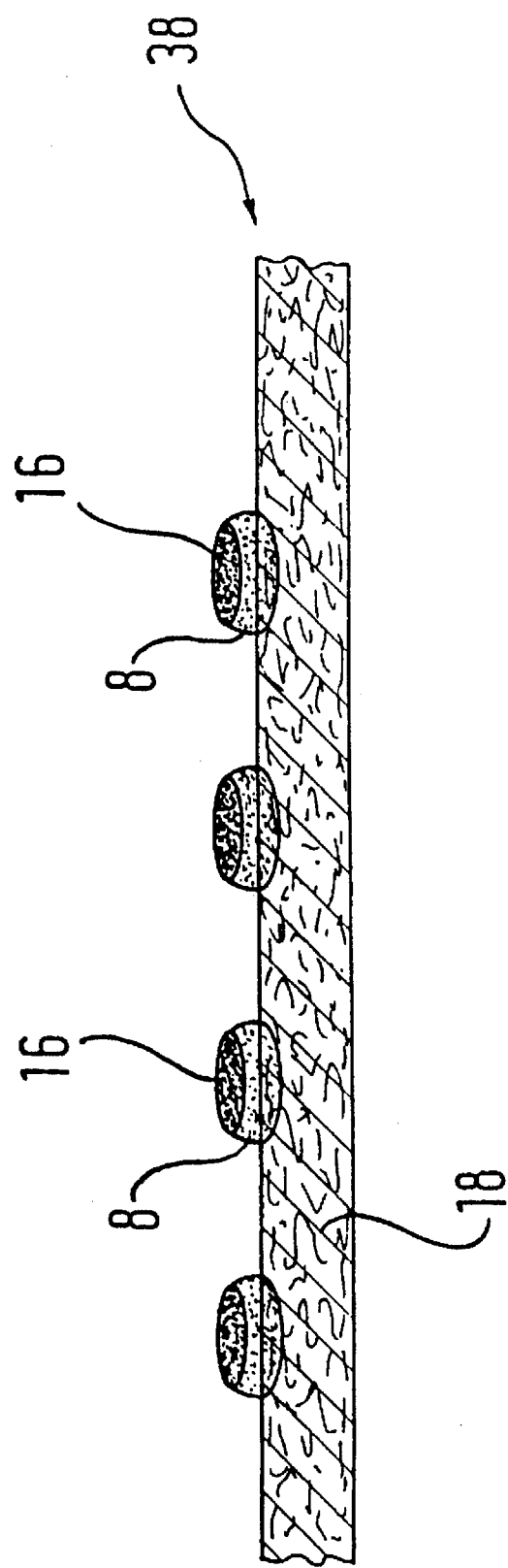
Figure 2:
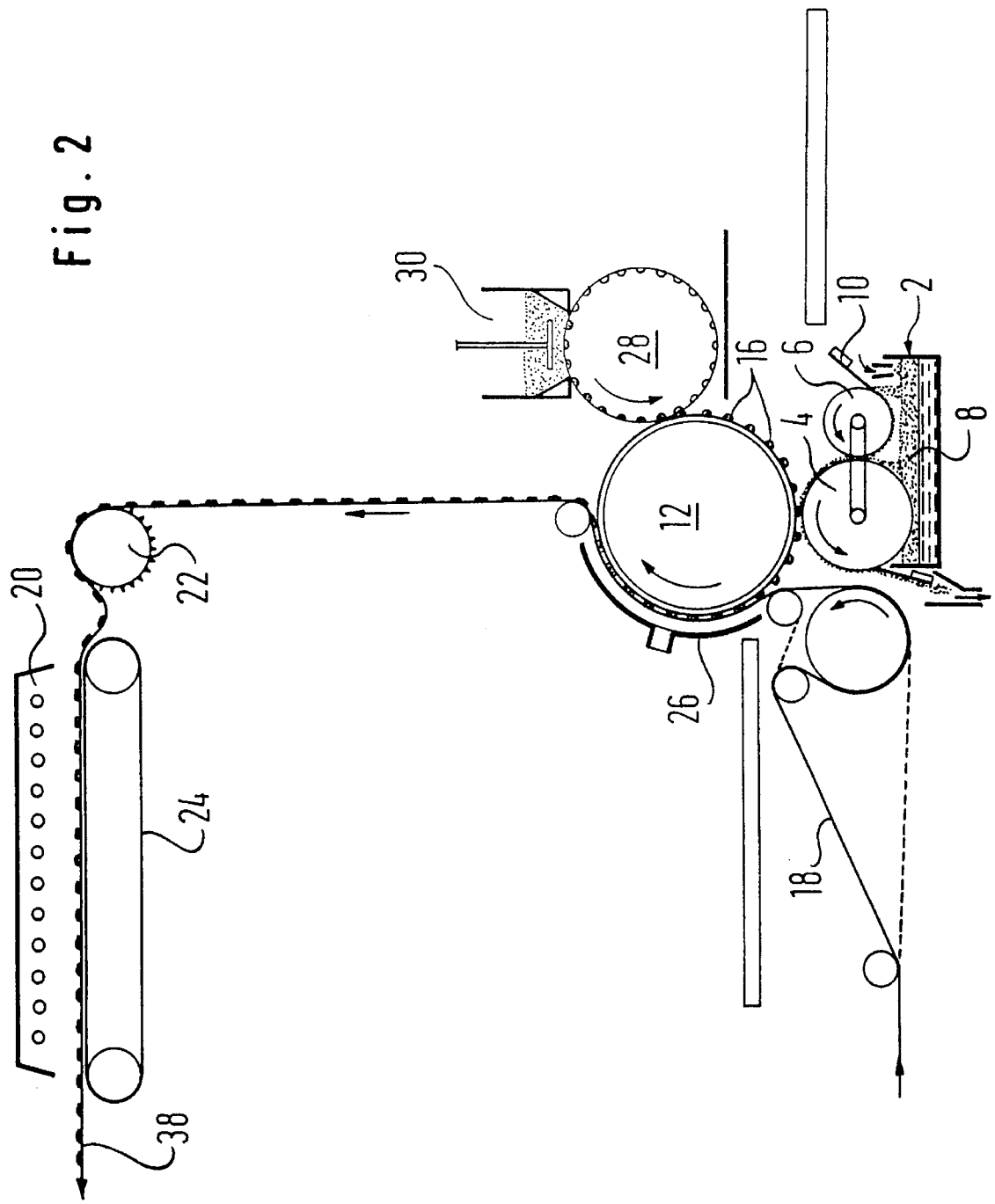
Figure 3:
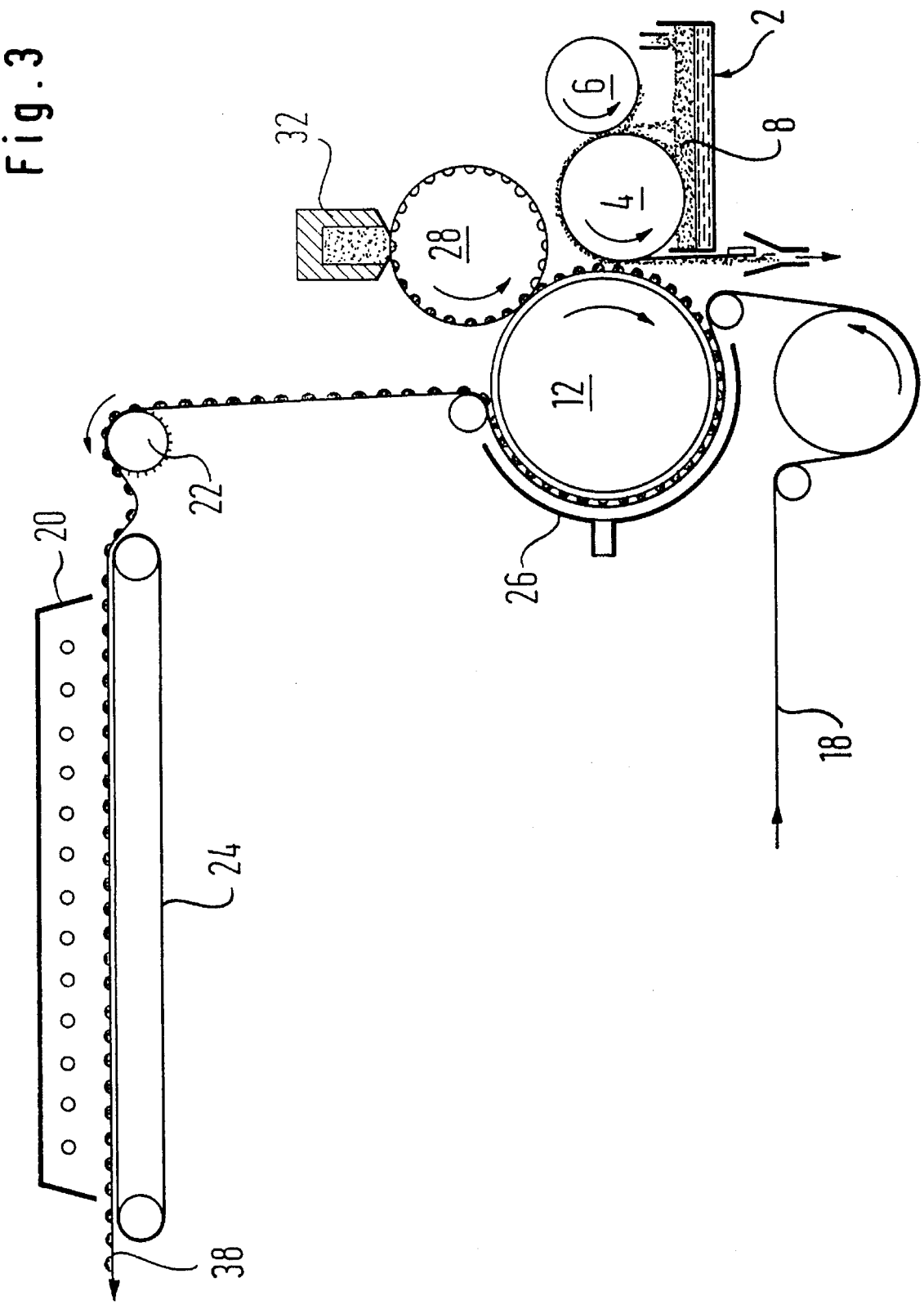
Figure 4:
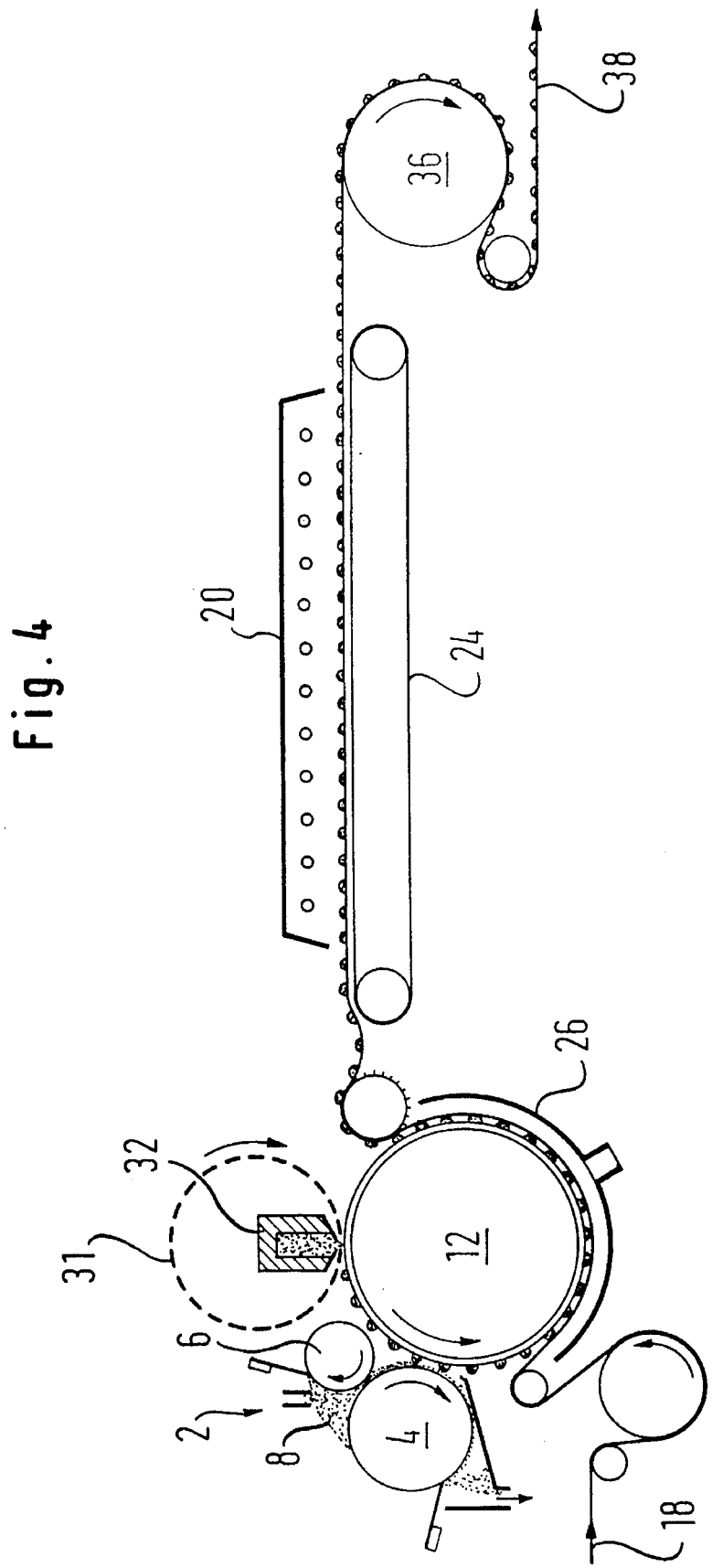
Figure 5:
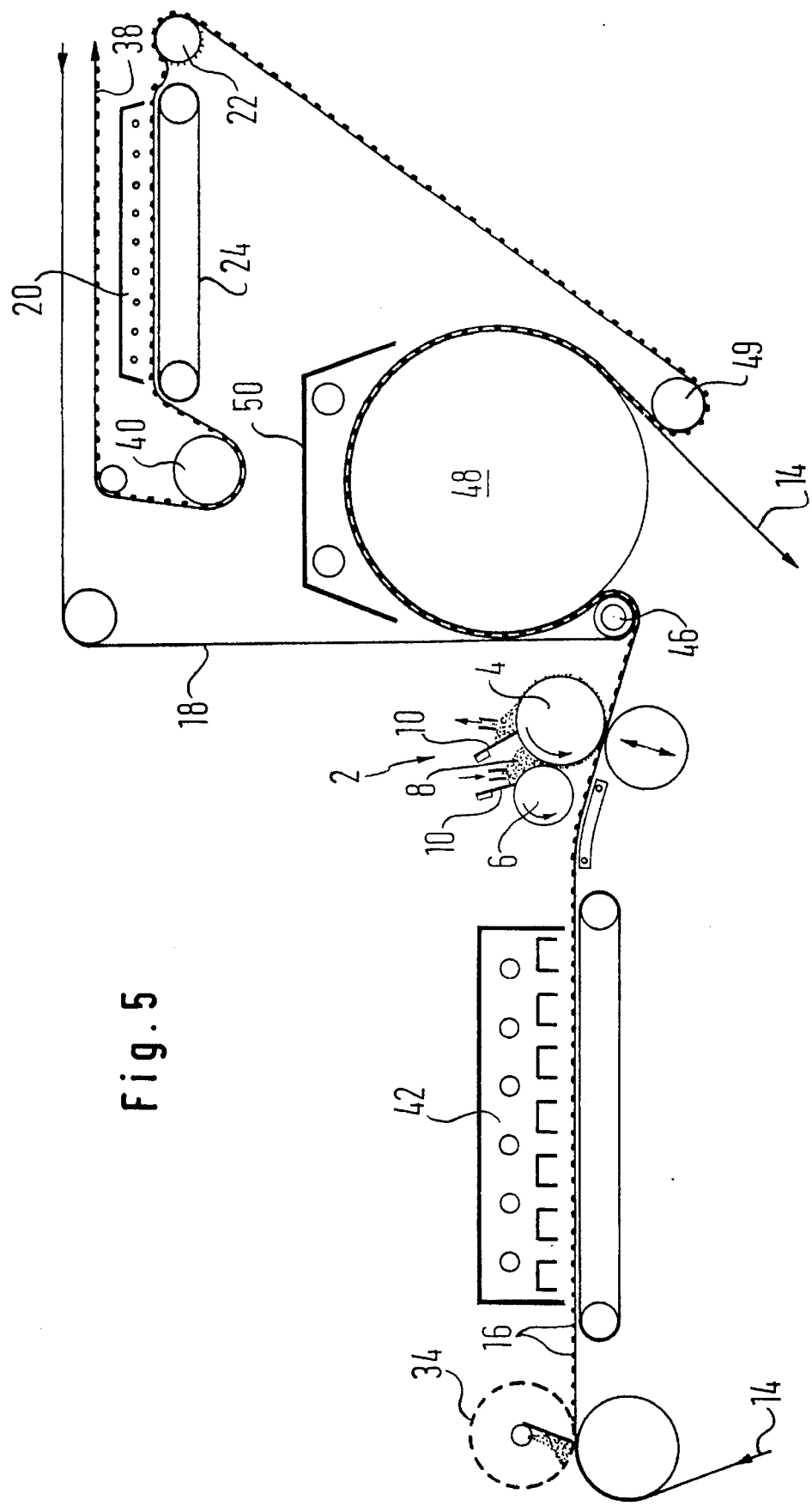
Figure 6:
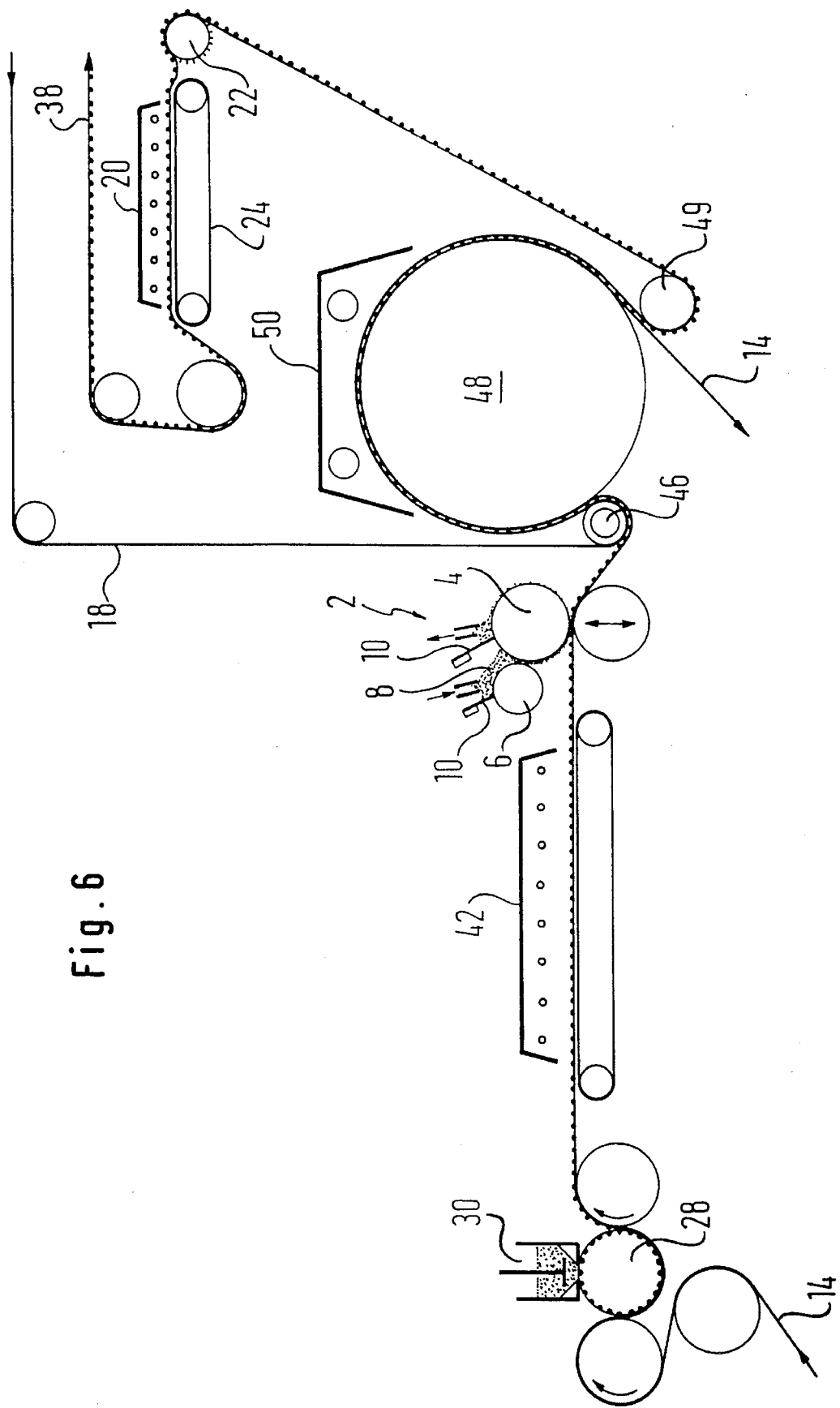
Figure 7:
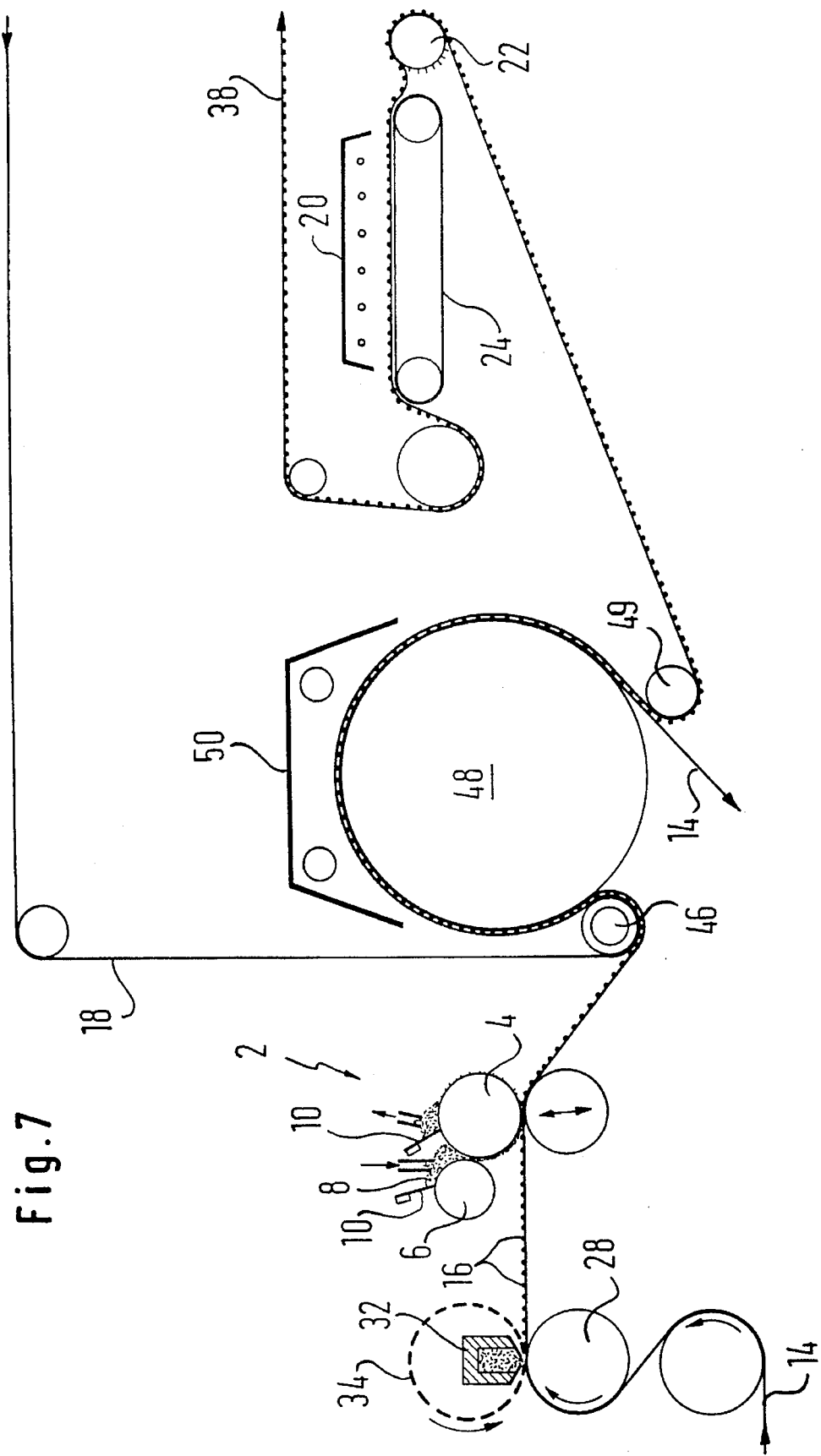
Figure 8:
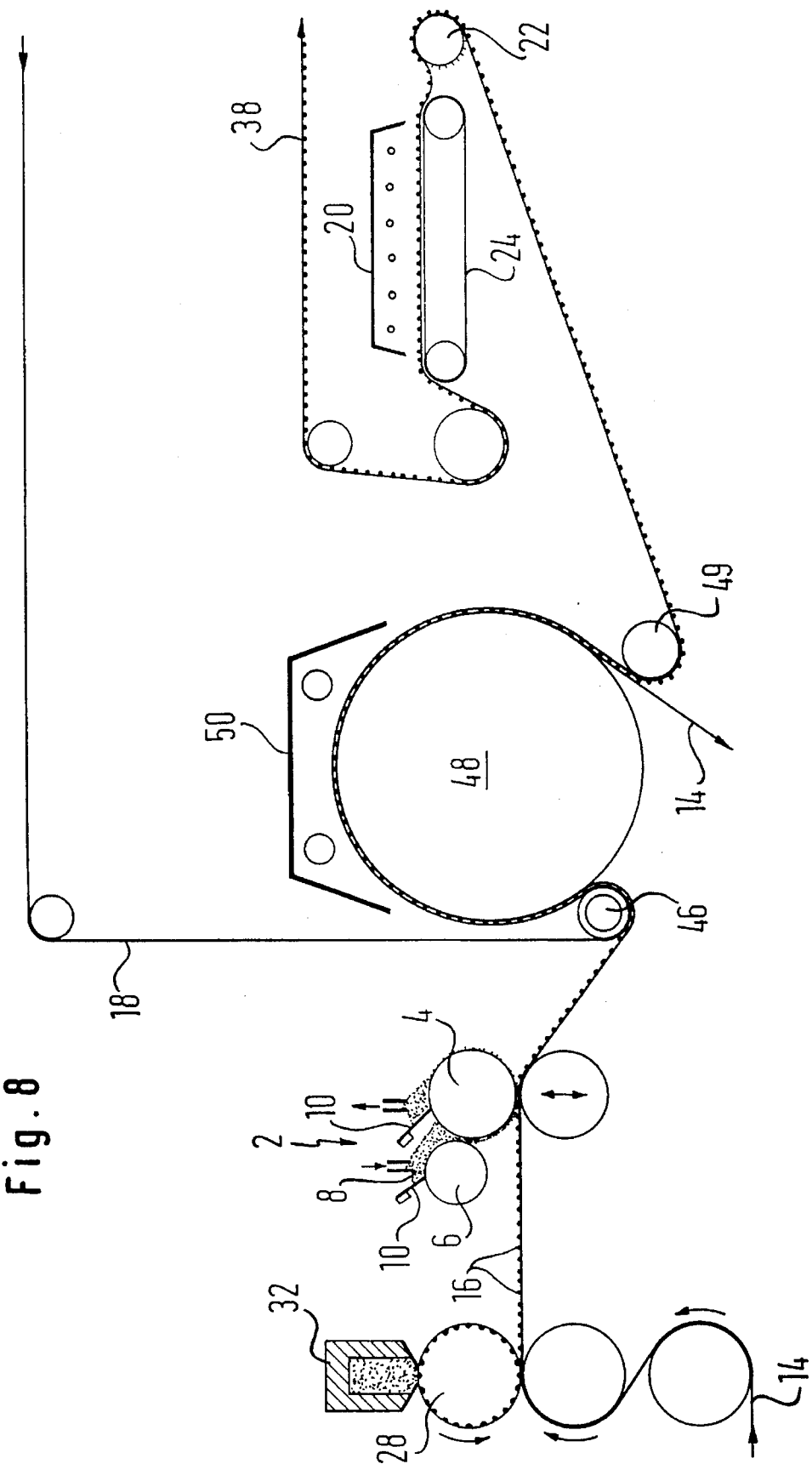
Figure 9:
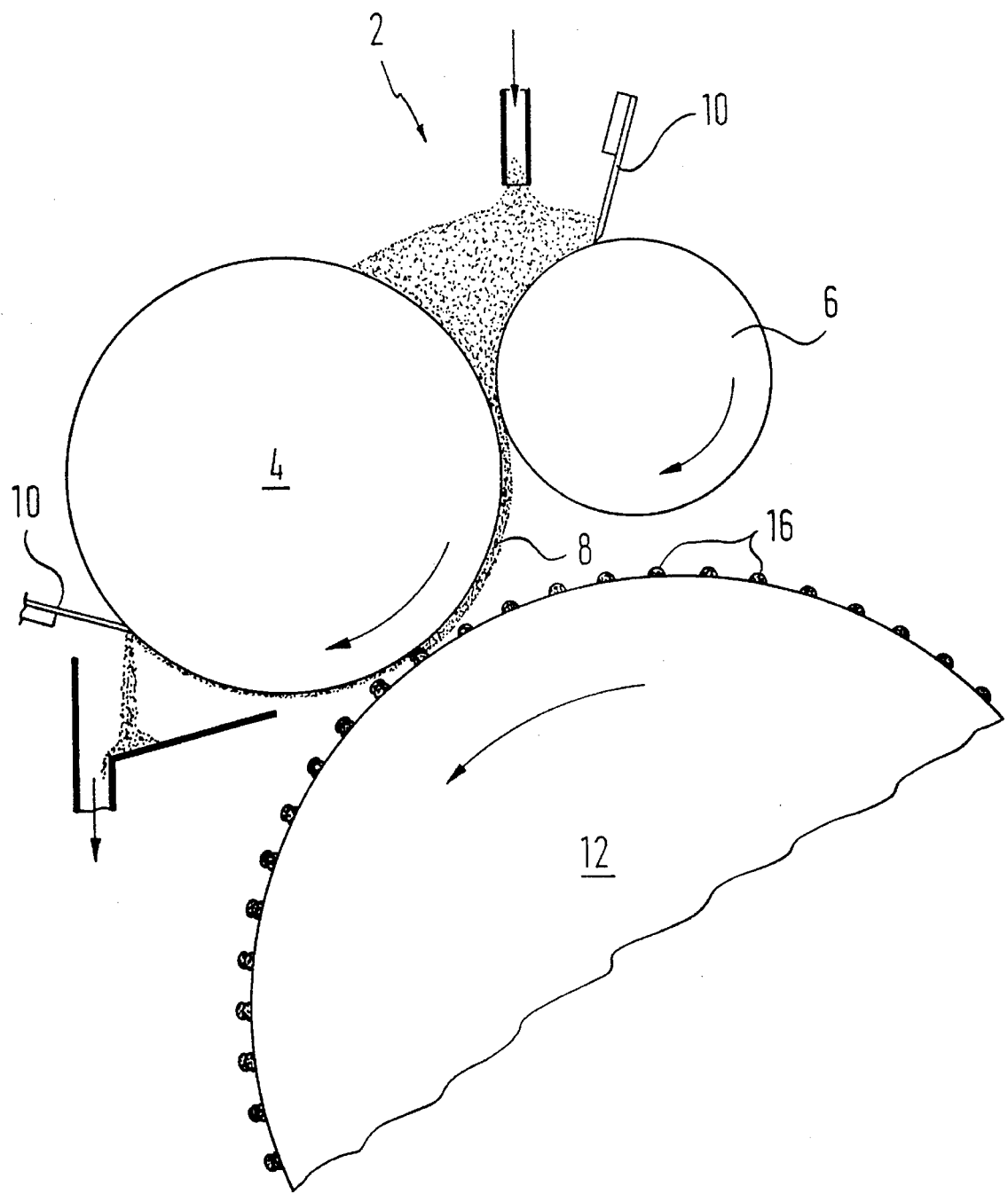

FIG. II: A powder dot gravure printing method under use of a rubber-coated heating roller as an intermediate carrier;

FIG. III: A hot melt gravure printing method under use of a rubber-coated heating roller as an intermediate carrier;

FIG. IV: A hot melt screen printing method under use of a rubber-coated heating roller as an intermediate carrier;

FIG. V: A paste screen printing method under use of a rubber-coated carrier band as an intermediate carrier;

FIG. VI: A powder dot gravure printing method under use of a rubber-coated carrier band as an intermediate carrier;

FIG. VII: A hot melt screen printing method under use of a rubber-coated carrier band as an intermediate carrier;

FIG. VIII: A hot melt gravure printing method under use of a rubber-coated carrier band as an intermediate carrier; and FIG. IX: A rollcoater ehich is suitable for the application of the film mass on the hot melt adhesive-containing dots.

The method which is illustrated in FIG. V is particularly preferred because it allows the hot melt adhesive mass to widely vary. The method is also particularly preferred because it still permits additional powder to be distributed before the application of the film mass with the rollcoater on the paste dots, whereby the dot height is enlarged and a triple layered dot structure forms after the rollcoater application which produces particularly excellent adhesion strengths and results in the highest resistance to washing at mild fixation conditions, as they were not previously obtainable.

The rollcoater (2) used in all methods which are illustrated in the FIGS. II to VIII possesses an application roller (4) and a dosage roller (6) (see FIG. IX). A thinner, or in the thickness variably consistent thicker, still fluid film (8) of a dispersion or solution with a, for example, curable plastic component no longer thermo-activatable under the fixation conditions is applied on the application roller (4) by means of a dosage roller (6) moving in the same direction on which a doctor blade rests. The feeding with the film mass occurs through immersion of the application roller (4) in a dipping tank containing the film mass whose floor can be water cooled. It is also possible to lay the mass on the adjustable slot between application roller (4) and dosage roller (6) with feeder tube. Thereby, the slot opening determines the film thickness. The application roller (4) moves with the same circumferential speed as the intermediate carrier which is either a rubber-coated heating roller (12) or a rubber-coated carrier band (14). A doctor blade can also rest on the application roller (4) which removes the residue of the film which remains on the application roller (4) after the transfer on the intermediate carrier (12, 14). The residues of the film mass are continuously pumped over a filter and cleared of any impurities.

In the FIGS. II to IV, the method for the raster-pattern coating of fabrics with hot melt adhesive according to the invention is illustrated, wherein a rubber-coated heating roller (12) is used here as an intermediate carrier. The hot melt adhesive (16) is applied thereby either in the powder dot method (FIG. II), hot melt gravure printing method (FIG. III), or hot melt screen printing method (FIG. IV). Suitable, commonly used devices are employed for this. In the powder dot gravure printing method shown in FIG. II, a shaker (30) with a powder funnel as well as an engraved roller (28) and a heating roller (12) are used. The hot melt adhesive powder is applied by the engraved roller (28) which is pressed on the rubber-coated heating roller (12) so that the powder is transferred in a raster-pattern on the heating roller. The hot melt adhesive dots (16) are then moved through rotation of the heating roller (12) in the direction of the application roller (4) of the rollcoater (2). On the section from the application of the powder to the laying-on point of the rollcoater, the particles sinter together, at least partially, through the temperature influence of the heating roller. Then, an application with the film mass (8) with the rollcoater occurs in such a way that only the heads of the hot melt adhesive dots (16) are provided with the film mass After the wetting of the hot melt adhesive dots with the film mass and a certain pre-drying, the final support (18) is fed from a non-represented device, optionally over deflection and pre-heating rollers, to the rubber-coated heating roller (12), and laid on this heating roller-intermediate carrier coated with film mass and hot melt adhesive. The composite material produced in this manner is lead through under a protection and ventilation hood (26) in order to pull off volatile components. After being lead through under the protection and ventilation hood (26), the final support (18), on which the hot melt adhesive wet with the film mass is now anchored, is optionally pulled off from the heating roller (12) over a deflection roller under entrainment of the entire coating and lead over a take-off and compression roller (22) to a transport band (24) of a heating device (20). Preferably, this heating device (20) is an infrared radiator. The final drying of the coated fabric, a subsequent sintering of the hot melt adhesive and, optionally, a subsequent curing of the applied film mass (8) occurs here. After being led through this heating device (20), the finished coated fabric (38) is obtained and can be wound and stored until further use.

The method which is represented in FIG. III is distinguished from method represented in FIG. II mainly with respect to the manner of the application of the hot melt adhesive. According to FIG. III, the melted hot melt adhesive in the gravure printing method is applied on a silicon rubber-coated heating roller under use of a hot melt doctor blade (32) and a heated engraved roller (28). Subsequently, the wetting of the hot melt adhesive (16) with the film mass (8) as well as the transfer on the final support occurs as described above.

Finally, FIG. IV shows the application of the melted hot melt adhesive by means of screen stencil (34) with a hot melt doctor blade (32). The remaining method steps are nearly analogous to the corresponding method steps which were described in connection with FIG. II. After being led through the heating device (20), the fabric (38) is lead over a cooling roller (36).

The FIGS. V to VIII describe the transfer coating under use of a carrier band (14) as an intermediate carrier. It is understood that the carrier band (14) can be formed in the shape of a continuous band, which is not specially represented in these FIGS.

In FIG. V, the hot melt adhesive is applied through a paste screen printing method. A customary screen stencil (34) is used for this. A counter roller lies on the screen stencil (34) and the carrier band (14) is lead through and coated between this roller and the screen stencil (34).

After the coating of the carrier band with the still moist hot melt adhesive paste dots (16), it is directly guided through a device (42) with transport band to dry and sinter, or still spread beforehand with powder, for example with hot melt adhesive powder with higher melt onset, higher melt viscosity and increased resistance to washing as they are represented by the common commercial copolyamides with higher laurinlactam content. After the spreading, the powder excess not sticking to the dots is blown off and suctioned off (for the removal by suction see Sroka at pages 134–136). Instead of copolyamide powders, copolyester, high-density polyethylene or PVC powder can be spread. Subsequently, a cooling of the coated carrier band to room temperature occurs, for example, through gliding of the band over a curved cooling surface (plate cooler) and the wetting of the hot melt adhesive dots and/or hot melt adhesive-containing dots with the film mass (8) occurs with the aid of the rollcoater (2). It is advantageous to provide a moveable counter roller on an adjustable slot under the application roller (4), wherein the carrier band (14) is lead through between these two rollers. The slot width is adjusted in such a way that only the heads of the hot melt adhesive dots and/or hot melt adhesive-containing dots are wet. In order to bind the thereby applied wetting layer with the final support and to dry and solidify on the carrier band, it is advantageous to combine the carrier band (14) with the final support on a soft rubber-coated squeeze roller (46) which delivers the produced liner composite material on a large dimensioned heating roller (48) which is heated to an increased temperature, for example to 90°–120° C. A suction duct (50) is provided over the heating roller (48) which should remove the volatile materials from the coated fabric (18). By emergence of the carrier band (14) on the squeeze roller (46) the fabric to be coated is laminated on the carrier band (14). This composite material of carrier band and fabric to be coated is moved over the heating cylinder (48), and, subsequently, a nearly to completely coating-free separation of the intermediate carrier (14) occurs after the adhesive anchoring of the wet and dried hot melt adhesive-containing dots on the fabric. The coated fabric with received coating can be lead over a further deflection roller (49) to a heating device (20) which has a transport band (24). Also in this case, a take-off and compression roller (22) is deployed before the heating device (20). After the guiding of the coated fabric (38) through the heating device (20), it is guided over a cooling roller (40) and can subsequently be wound and stored until further use.

The carrier band (14) separated after the heating cylinder can be lead to a cleaning device (not shown). This cleaning device can have spurt pipes and a round brush for the removal of coating residues still sticking. Thereafter, it is guided through between two squeeze rollers for the removal of residual moisture from which one is a moveable rubber roller. Subsequently, the carrier band can either be wound until re-use or lead directly to a new coating operation. It is also possible to carry out the cleansing dry, for example through laying and pressing of the carrier band on a heating roller which is wrapped with an interchangeable coat of textile or paper that pulls off the residual adhesive.

The FIGS. VI to VIII describe coating methods which are mainly distinguished from the coating methods according to FIG. V in that the type of the coating with the melting point is different. According to FIG. VI, the hot melt adhesive coating occurs by the powder gravure printing method by means of a shaker (30), powder funnel, engraved roller (28) and at least one contacted heating roller. The engraved roller (28) is heated to ca. 25° to 40° C. At least one (pre-)heating roller brings the carrier band to a higher temperature before and/or after the coating operation with hot melt adhesive powder. The heating rollers can be heated to a surface temperature of 135°–170° C. The sintering of the hot melt adhesive dots occurs on the heating roller and in the sinter duct (42).

According to FIG. VII, the application of the melted hot melt adhesive occurs with the aid of a screen stencil (34) with hot melt doctor blade (32). A counter roller (28) which can optionally be heated is also present here.

In FIG. VIII, the hot melt adhesive is applied through the hot melt gravure printing method under use of a hot melt doctor blade (32) and an optionally heated engraved roller (28). In the methods according to FIGS. VII and VIII a drying of the hot melt adhesive layer after their coating operation is omitted.

In FIG. IX, a rollcoater (2) used according to the invention for the application of the film mass (8) on the hot melt adhesive layer is represented. From this Figure, it emerges that the contact between the film (8) applied on the application roller (4) and the raster-pattern coating (16) resting on the rubber-coated heating roller (12) is adjusted in such a way that the heads of the hot melt adhesive (16) are evenly wet. The film mass (8) remaining on the application roller (4) after the wetting of the hot melt adhesive raster (16) is knifed-off and continuously pumped over a filter and thereby freed from any impurities. The application roller (4) and/or the dosage roller (6) can be cooled from inside with water.

In an analogous manner, a raster-pattern coated carrier band (14) is also wet with the film applied on the application roller (4). After leaving the heating roller (12) or the heating cylinder (48) and at the separation of the final support (18) from the intermediate carrier (14), the volatile components of the film mass (8) should in any case be predominantly or entirely volatilized. It should also be avoided that the application roller (4) or the final support lying on the intermediate carrier (14) exert a raster-pattern deforming pressure on the transfer coating. This also applies at the point at which the intermediate carrier (14) is detached from the final support (18).

In the following, still additional exemplary statements are made about the properties of the equipment used in the method according to the FIGS. II to VIII. Thereby, as long as it is not given, VESTAMID T730 (Trademark), a hot melt adhesive produced by Hüls, is employed.

FIG. II:
  Temperature of the surface of the engraved roller (28): ca. 25° to 40° C.
  Temperature of the surface of the rubber-coated heating roller (12): 145° to 150° C.
  Speed of the heating roller (12): ca. 10 to 15 m/min.
  Distance between dosage roller (6) and application roller (4): 0.20 mm at 17 mesh.
  Distance between application roller (4) and heating roller (12): 0.25 mm at 17 mesh.

FIG. III:
  Temperature of the surface of the engraved roller (28): ca. 140° C.
  Temperature of the surface of the rubber-coated heating roller (12): ca. 140° C.
  Speed of the heating roller (12): ca. 15 to 20 m/min.
  Distance between dosage roller (6) and application roller (4): 0.20 mm at 17 mesh.
  Distance between application roller (4) and heating roller (12): 0.25 mm at 17 mesh.

FIG. IV:
  Screen stencil: pre-heated.
  Temperature of the surface of the rubber-coated heating roller (12): ca. 140° C.
  Speed of the heating roller (12): ca. 15 to 20 m/min.
  Distance between dosage roller (6) and application roller (4): 0.20 mm at 17 mesh.
  Distance between application roller (4) and heating roller (12): 0.25 mm at 17 mesh.

FIG. V:
  Printing paste: application of VESTAMID T730 (Trademark).
  Drying and sinter duct (42) ca. 110°–160° C.
  Temperature of the surface of the heating cylinder (48): ca. 90°–120° C.
  Speed of the carrier band (14): ca. 40 m/min.
  Carrier band (14): PES textile, silicon rubber-coated, thickness 0.14 mm.
  Distance between dosage roller (6) and application roller (4): 0.20 mm.
  Distance between application roller (4) and the counter roller of the rollcoater (2): 0.45 to 0.50 min.
  In cases of the spreading of the paste dots: scattering powder GRILTEX 2P1 (Trademark of Ems-Chemie)

FIG. VI:
  Surface temperature of the engraved roller (28): ca. 35° C.
  Surface temperature of the heating roller (12): ca. 180° C.
  Heating device (42) with infrared for the sintering: dark red glow.
  Surface temperature of the heating cylinder (48): 90°–120° C.
  Speed of the carrier band (14): ca. 30 m/min.
  Carrier band (14) as well as the distances between dosing roller (6) and application roller (4) and/or application roller (4) and counter roller of the rollcoater (2) as in FIG. V FIG. VII:
  Screen stencil: heated.
  Surface temperature of the heating roller (12): ca. 180° C.
  Surface temperature of the heating cylinder (48): 90°–120° C.
  Speed of the carrier band (14): ca. 40 m/min.
  Carrier band (14) as well as the distances between dosing roller (6) and application roller (4) and/or application roller (4) and counter roller of the rollcoater (2) as in FIG. V FIG. VIII:
  Surface temperature of the engraved roller (28): ca. 140° C.
  Surface temperature of the heating roller (12): ca. 140° C.
  Surface temperature of the heating cylinder (48): 90°–120° C.
  Speed of the carrier band (14): ca. 40 m/min.
  Carrier band (14) as well as the distances between dosing roller (6) and application roller (4) and/or application roller (4) and counter roller of the rollcoater (2) as in FIG. V

I claim:

1. A method for the raster pattern coating of fabrics comprising (a) applying a raster pattern of a plurality of dots of a hot melt adhesive onto an intermediate carrier; (b) applying a liquid layer of a dispersion or a solution of a curable plastic onto the tops of said hot melt adhesive dots; and (c) transferring said hot melt adhesive dots coated on its tops with said curable plastic onto a final support.

2. A method in accordance with claim 1 wherein said curable plastic is selected from the group consisting of a polymethacrylate, a polyacetate, a polybutadiene styrene, a polybutadiene styrene acrylonitrile, a polyacrylonitrile, a polyurethane, a urea-formaldehyde resin, a melamineformaldehyde resin, an alkylurea-formaldehyde resin and an etherification product of any of the above.

3. A method in accordance with claim 1 wherein said liquid layer is partially dried prior to said step (c).

4. A method in accordance with claim 1 wherein said liquid layer is completely dried prior to said step (c).

5. A method in accordance with claim 1 wherein said step (b) involves no deforming pressure on said dots of said hot melt adhesive.

6. A method in accordance with claim 1 wherein said step (c) involves no deforming pressure on said dots of said hot melt adhesive.

7. A method in accordance with claim 1 wherein said hot melt adhesive is selected from the group consisting of copolyamides, copolyesters, polyurethanes, high density polyethylenes and mixtures thereof.

8. A method in accordance with claim 7 wherein said hot melt adhesive includes an aerating agent.

9. A method in accordance with claim 1 including the step of (d) heat treating said final support.

10. A method in accordance with claim 9 wherein said product of said step (c) is directed to said step (d) by means of a take-off and compression roller provided with a nonslip coat.

11. A method in accordance with claim 9 wherein said step (b) includes the immersion of said tops of said hot melt adhesive dots, disposed on said intermediate carrier in said liquid layer disposed on an application roller; said step (c) includes disposing said final support on said intermediate support wherein said hot melt adhesive dots are transferred from said intermediate carrier to said final support; said step (d) includes heating said final support until said curable plastic is cured; and optionally, subsequently sintering said cured plastic.

12. A method in accordance with claim 11 wherein said intermediate carrier is a heating roll provided with a silicone rubber cover.

13. A method in accordance with claim 12 wherein said silicone rubber cover is 0.5 to 2.0 mm thick.

14. A method in accordance with claim 11 wherein, said intermediate carrier is a carrier band covered with silicone rubber.

15. A method in accordance with claim 14 wherein said carrier band has a thickness of 0.10 to 0.15 mm.

16. A method in accordance with claim 14 wherein said carrier band forms a loop.

17. A method in accordance with claim 14 wherein said carrier band has a beginning and an end and is wound and unwound.

18. A method in accordance with claim 14 wherein said silicone rubber cover of said carrier band covers a textile formed of a fiber selected from the group consisting of polyester, polyamide, a polyaromatic, glass fibers and carbon fibers.

19. A method in accordance with claim 1 wherein said step (a) occurs by powder gravure printing, hot melt gravure printing or screen printing.

20. A method in accordance with claim 19 wherein said step (a) occurs by screen printing wherein a spreading powder of a polymer selected from the group consisting of copolyamides, copolyesters, high density polyethylenes, polyvinyl chlorides and mixtures thereof is disposed on said intermediate carrier; said hot melt adhesive dots heated; and excess spreading powder not sticking to said dots is removed.

21. A fabric prepared by the method of claim 1.

22. A fixable lining material for clothing article formed of the fabric of claim 21.

* * * * *